United States Patent [19]

Riesenberg

[11] Patent Number: 4,498,334

[45] Date of Patent: Feb. 12, 1985

[54] APPARATUS FOR MEASURING FUEL CONSUMPTION IN AN INTERNAL COMBUSTION ENGINE

[75] Inventor: Klaus-Otto Riesenberg, Ludwigsburg, Fed. Rep. of Germany

[73] Assignee: Robert Bosch GmbH, Stuttgart, Fed. Rep. of Germany

[21] Appl. No.: 433,119

[22] PCT Filed: Mar. 31, 1982

[86] PCT No.: PCT/DE82/00075
§ 371 Date: Sep. 30, 1982
§ 102(e) Date: Sep. 30, 1982

[87] PCT Pub. No.: WO83/00221
PCT Pub. Date: Jan. 20, 1983

[30] Foreign Application Priority Data

Jul. 9, 1981 [DE] Fed. Rep. of Germany ....... 3127123

[51] Int. Cl.³ .............................................. G01F 9/00
[52] U.S. Cl. .................................................. 73/113
[58] Field of Search ................... 73/113, 114, 119 A

[56] References Cited

U.S. PATENT DOCUMENTS

| 3,973,536 | 8/1976 | Zelders | 73/113 X |
| 4,141,243 | 2/1979 | Van Tassel | 73/119 A |
| 4,253,330 | 3/1981 | Kato | 73/113 |

Primary Examiner—John W. Caldwell, Sr.
Assistant Examiner—E. G. Harding
Attorney, Agent, or Firm—Edwin E. Greigg

[57] ABSTRACT

An apparatus for measuring fuel consumption in an internal combustion engine the fuel supply system of which has a circulation line for the purpose of cooling the fuel pump. At the times when fuel consumption is measured, this circulation line is short-circuited downstream of a flow measuring device disposed in the supply line, so that then only the quantity of fuel delivered to the engine flows through the supply line from the tank, thus flowing through the flow measuring device as well. Because of the heating up of the fuel, the shortened fuel circuit is effected only at such time as a measurement procedure is desired. In the exemplary embodiment, a 3/2-way valve is used for switching over the fuel return line.

3 Claims, 2 Drawing Figures

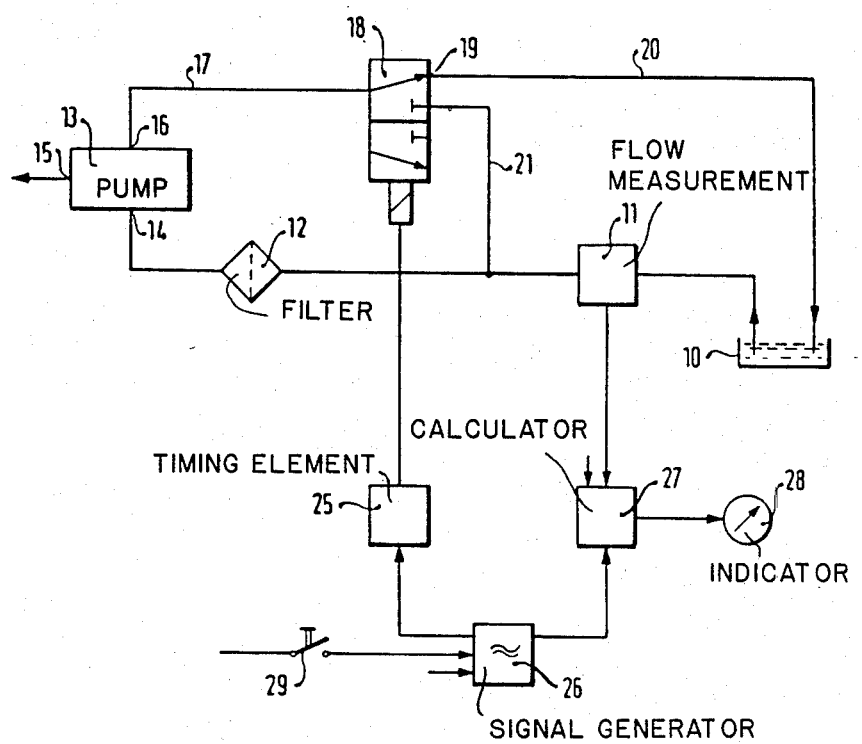
FIG. 1
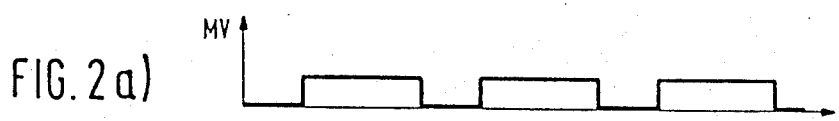
FIG. 2
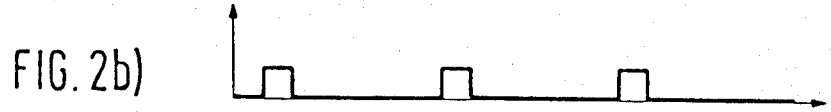

APPARATUS FOR MEASURING FUEL CONSUMPTION IN AN INTERNAL COMBUSTION ENGINE

STATE OF THE ART

The invention is based on an apparatus for measuring fuel consumption in an internal combustion engine. Present-day fuel pumps, because of their dimensions, require a medium for carrying away heat. This purpose is served by the fuel to be pumped, which is thus heated up during the course of its circulation through the pump. In order to prevent gas bubbles in the fuel caused by excessive heating of the fuel, it is necessary to flush the pump with a quantity of fuel greater than what must be delivered to the engine. However, given this increased supply quantity of the pump, the problem arises of precise measurement of fuel consumption, because the quantity actually consumed is the supply quantity minus the recirculated quantity.

A known apparatus for measuring the consumption of fuel by an internal combustion engine provides a flow quantity measuring device in the fuel line from a main tank to an auxiliary tank; the fuel pump then pumps the fuel from this auxiliary tank to the engine and the flushing quantity is returned to the auxiliary tank. The auxiliary tank, in combination with the fuel supply pump and the return flow line, thus comprises a circulatory system for fuel, and the flow meter in the connecting line between the main tank and the auxiliary tank detects solely the quantity of fuel actually consumed.

This known apparatus for measuring fuel consumption necessitates considerable additional expense, because of the auxiliary tank; it furthermore represents a safety risk since fuel must be stored continuously in this auxiliary tank.

ADVANTAGES OF THE INVENTION

In the apparatus according to the invention for measuring fuel consumption in an internal combustion engine, the additional expense for structural components is kept within limits, and the safety risk is negligible. The apparatus is simple and thus not very vulnerable to malfunctions.

DRAWING

One exemplary embodiment of the invention is shown in the drawing and will be described and explained in greater detail below.

FIG. 1 shows the basic structure of the apparatus for measuring fuel consumption, and FIG. 2 is a pulse diagram relating to the individual elements of the apparatus.

DESCRIPTION OF THE EXEMPLARY EMBODIMENT

The invention relates to an apparatus for measuring fuel consumption in an internal combustion engine having self-ignition. The fuel tank is marked 10, a flow quantity measuring unit is marked 11, a fuel filter is marked 12, and the fuel pump is marked 13. This fuel pump has an inflow connection 14, as well as a high-pressure connection 15 and finally a return flow connection 16. The pump 13 communicates in a known manner with an injection nozzle via the high-pressure connection 15.

Located in a return flow line 17 which begins at the return flow connection 16 is an electromagnetically actuatable 3/2-way valve 18, the output 19 of which is normally switched through and is coupled with a tank return flow line 20; the second output connection of the valve 18 is coupled via a special line segment 21 with the connecting point of the flow meter 11 and the filter 12.

The exciter winding of the valve 18 receives trigger signals from a timing element 25, which is triggered in turn by a time signal generator circuit 26. In the simplest case, the timing element 25 comprises a monostable multivibrator. The time signal generator circuit 26 further communicates with a consumption calculating device 27, which additionally receives signals from flow quantity meter 11. The consumption calculating device 27, at specified times, processes the output signal of the flow meter 11 and causes the consumption value to be indicated in a viewing device or instrument 28 in a manner associated with either elapsed time or distance travelled.

FIG. 2a shows the trigger signal for the exciter winding of the valve 18. In FIG. 2b, a signal train is shown; during the course of the pulse duration of this train, the output signal of the flow meter 11 is processed in order to determine the fuel consumption.

From FIG. 1 it will be seen that in the state of rest, the fuel flows from the tank through the flow meter 11 and the filter 12 to reach the fuel pump 13, and from there the flushing quantity flows back into the tank via the return flow line 17, the valve 18 and the tank return flow line 20. By means of the reversible 3/2-way valve, a circulatory system for fuel can be provided, which includes the filter 12, the pump 13 and the valve 18. Because of the substantially incompressible nature of the fuel in the case of this "internal" fuel circuit, only the quantity of fuel which is delivered via the high-pressure connection 15 to the injection nozzles of the engine is withdrawn from the tank 10. Although this state cannot be maintained very long, because of the heating up of the fuel that occurs, still this period of time is as a rule sufficient for performing a measurement of fuel consumption. A comparison of the diagrams in FIGS. 2a and 2b shows that the signal processing for the fuel consumption measurement only begins a certain period of time after the switchover of the valve 18 and naturally ends, at the latest, when the valve 18 is switched back again.

The time when the trigger circuit 26 emits an output signal in order to initiate the measurement process depends on the individual instance. Not only measurements at uniform time intervals but also measurements dependent on operating characteristics such as rpm or acceleration are possible. It is furthermore also efficacious to trigger this measurement process by means of a switch 29 accommodated in the passenger compartment of the vehicle.

The individual elements of the apparatus for measuring fuel consumption shown in FIG. 1 are known per se to one skilled in the art and therefore require no further explanation here. It has been demonstrated that the illustrated apparatus, despite its simplicity, is capable of furnishing satisfactory measurement results and is therefore excellently well suited for mass production use in particular.

I claim:

1. An apparatus for measuring fuel consumption in an internal combustion engine having fuel tank, a fuel pump which draws fuel from said fuel tank through an inflow line, a flow measuring device in said inflow line between said fuel tank and said fuel pump, a return flow line from said fuel pump to said fuel tank, control means for connecting said return flow line at least intermittently to the inflow line downstream of the flow measuring device and upstream of said fuel pump, means for controlling said control means in which said control means is activated only during a period of time in which said return flow line transmits fuel from said fuel pump to said inflow line downstream of said flow measuring device, and an evaluation circuit for producing a quantity signal only within a period of time in which said control means is operated to return fuel from said return line to said inflow line downstream of said flow measuring device.

2. An apparatus as defined by claim 1, characterized in that a switchover of the return flow line from said fuel tank to said inflow line is effected by means of an electromagnetically actuatable 3/2-way valve.

3. An apparatus as defined by claim 1, characterized in that the measurement cycle is provided toward the end of the fuel circulation period.

* * * * *